(12) United States Patent
Wang et al.

(10) Patent No.: US 11,506,857 B2
(45) Date of Patent: Nov. 22, 2022

(54) CAMERA MODULE AND ASSEMBLY METHOD THEREFOR

(71) Applicant: NINGBO SUNNY OPOTECH CO., LTD., Ningbo (CN)

(72) Inventors: Mingzhu Wang, Ningbo (CN); Hailong Liao, Ningbo (CN); Chunmei Liu, Ningbo (CN); Yiqi Wang, Ningbo (CN); Shuijia Chu, Ningbo (CN)

(73) Assignee: NINGBO SUNNY OPOTECH CO., LTD.

( * ) Notice: Subject to any disclaimer, the term of this patent is extended or adjusted under 35 U.S.C. 154(b) by 315 days.

(21) Appl. No.: 16/643,194

(22) PCT Filed: Apr. 20, 2018

(86) PCT No.: PCT/CN2018/083923
§ 371 (c)(1),
(2) Date: Feb. 28, 2020

(87) PCT Pub. No.: WO2019/047534
PCT Pub. Date: Mar. 14, 2019

(65) Prior Publication Data
US 2020/0192051 A1 Jun. 18, 2020

(30) Foreign Application Priority Data
Sep. 11, 2017 (CN) .......................... 201710814250.2

(51) Int. Cl.
*G02B 7/02* (2021.01)
*H04N 5/225* (2006.01)

(52) U.S. Cl.
CPC ............. *G02B 7/021* (2013.01); *G02B 7/022* (2013.01); *G02B 7/025* (2013.01); *H04N 5/2254* (2013.01)

(58) Field of Classification Search
CPC .......... G02B 7/021; G02B 7/02; G02B 7/003; G02B 13/0015; G02B 7/025;
(Continued)

(56) References Cited

U.S. PATENT DOCUMENTS

2007/0103701 A1  5/2007  Yamashita et al.
2016/0061594 A1  3/2016  Kim et al.
(Continued)

FOREIGN PATENT DOCUMENTS

CN       1624515 A       6/2005
CN     101105567 A   *   1/2008
(Continued)

OTHER PUBLICATIONS

Korean Intellectual Property Office, Written Opinion for Application No. 10-2020-7007290, 18 pages.
(Continued)

*Primary Examiner* — Ephrem Z Mebrahtu
(74) *Attorney, Agent, or Firm* — Barnes & Thornburg LLP

(57) ABSTRACT

The present invention provides a method for assembling a camera module, including: preparing a first sub-lens assembly and a second sub-assembly, wherein the second sub-assembly includes a second sub-lens assembly and a photosensitive assembly fixed together; arranging the first sub-lens assembly on an optical axis of the second sub-lens assembly to form an optical system capable of imaging; adjusting a relative position of the first sub-lens assembly with respect to the second sub-lens assembly, so as to increase an actual measured resolution of imaging of the optical system, obtained by using the photosensitive element, to a first threshold, and decrease an actual measured image plane inclination obtained by using the photosensitive element to a second threshold; and connecting the first
(Continued)

sub-lens assembly and the second sub-lens assembly. The present invention further provides a corresponding camera module.

18 Claims, 10 Drawing Sheets

(58) Field of Classification Search
CPC .............. G02B 13/0045; G02B 13/004; H04N 5/2254; H04N 5/2253
See application file for complete search history.

(56) References Cited

U.S. PATENT DOCUMENTS

| | | | |
|---|---|---|---|
| 2016/0170168 A1 | 6/2016 | Rohani et al. | |
| 2017/0123178 A1 | 5/2017 | Wang et al. | |
| 2017/0160509 A1* | 6/2017 | Wang | G02B 7/02 |
| 2017/0343831 A1* | 11/2017 | Bakin | G02B 27/0988 |
| 2018/0376071 A1* | 12/2018 | Wang | G02B 27/0025 |

FOREIGN PATENT DOCUMENTS

| | | | | |
|---|---|---|---|---|
| CN | 101105567 A | | 1/2008 | |
| CN | 101726986 A | | 6/2010 | |
| CN | 105445885 A | | 3/2016 | |
| CN | 105445889 A | * | 3/2016 | ......... G02B 13/0045 |
| CN | 105445889 A | | 3/2016 | |
| CN | 105487248 A | * | 4/2016 | ............ G02B 27/64 |
| CN | 105487248 A | | 4/2016 | |
| CN | 106888344 A | | 6/2017 | |
| CN | 107147904 A | | 9/2017 | |
| CN | 207340018 U | | 5/2018 | |
| JP | 2008014827 A | | 1/2008 | |
| JP | 2010156887 A | | 7/2010 | |
| JP | 2010230745 A | | 10/2010 | |
| JP | WO2012098808 A1 | | 6/2014 | |

OTHER PUBLICATIONS

International Search Report for PCT/CN2018/083923, dated Jun. 18, 2022, 3 pages.
First Search for Application No. 2018800567390, dated Oct. 21, 2020, 2 pages.

* cited by examiner

CAMERA MODULE AND ASSEMBLY METHOD THEREFOR

CROSS-REFERENCE TO RELATED APPLICATION

This application is a U.S. national counterpart application of international application serial No. PCT/CN2018/083923, filed Apr. 20, 2018 which claims priority to Chinese Patent Application No. 201710814250.2, filed on Sep. 11, 2017, the disclosures of both of which are incorporated herein by reference in their entireties.

TECHNICAL FIELD

The present invention relates to the field of optical technologies, and specifically to a camera module solution.

BACKGROUND

With the spread of mobile electronic devices, technologies related to camera modules applied to mobile electronic devices to help users with imaging (for example, capturing a video or an image) have developed rapidly. In recent years, camera modules have been widely applied in various fields such as health care, security protection, and industrial production.

To meet the increasingly extensive market demands, high resolution, small size, and large aperture are the irreversible trend of camera module development. The requirements of the market on the imaging quality of camera modules are becoming higher. Factors affecting the resolution of a camera module of a given optical design include the quality of an optical imaging lens assembly and the manufacturing deviations introduced in the module packaging process.

Specifically, during the manufacturing process of the optical imaging lens assembly, factors affecting the resolution of the lens assembly include assembly deviations of various parts, deviations in thickness of lens spacer elements, assembly deviations of the lenses, the change in the refractive index of the lens material, and so on. Among them, the assembly deviations of various parts include the optical surface thickness of each individual lens, the optical surface rise of the lens, the optical surface form, the radius of curvature, one-way and two-way eccentricity of the lens, the optical surface inclination of the lens, and so on. The values of such deviations depend on the mold precision and the molding precision control capability. The deviations in thickness of lens spacer elements depend on the machining precision of the elements. The assembly deviations of the lenses depend on the dimensional tolerances of the elements assembled and the assembly precision of the lens assembly. The deviations caused by the change in the refractive index of the lens material depends on the stability of the material and the batch consistency.

The deviations of the elements affecting the resolution may manifest as an accumulative deterioration, and the accumulative deviation increases as the number of lenses increases. In existing resolution solutions, dimensional tolerances of elements with high sensitivity are controlled, and lens turning is performed to increase the resolution. However, because a high-resolution, large-aperture lens assembly is sensitive and has strict tolerance requirements, for example, 1 μm lens eccentricity leads to 9' image plane inclination in some sensitive lens assemblies, the difficulty in lens machining and assembling increases. In addition, because the feedback period is long in the assembly process, the capability of process index (CPK) of the lens assembly is low and fluctuates greatly, leading to a high failure rate. Moreover, as described above, there are numerous factors affecting the resolution of the lens assembly, and such factors exist in various elements. Because the control of such factors is limited by the manufacturing precision, simply improving the precision of the elements only provides a limited effect, requires high costs, and cannot meet the increasingly high requirements of the market on the imaging quality.

On the other hand, in the machining process of the camera module, the assembly process of each structural part (for example, photosensitive chip mounting, motor lens assembly locking) may lead to an inclination of the photosensitive chip, and the resolution of the imaging module may be unable to reach the given specification due to the accumulation of multiple inclinations, resulting in a low yield in the module factory. In recent years, in the module factory, when the imaging lens assembly and the photosensitive module are assembled, an active alignment process is used to compensate for the inclination of the photosensitive chip. However, the compensation ability of such process is limited. Because multiple aberrations affecting the resolution are originated from the ability of the optical system itself, the existing active alignment process for the photosensitive module cannot compensate for the insufficient resolution of the optical imaging lens assembly.

SUMMARY

The present invention is to provide a solution that can overcome at least one of the defects of the prior art.

According to an aspect of the present invention, a method for assembling a camera module is provided, comprising:

preparing a first sub-lens assembly and a second sub-assembly, wherein the first sub-lens assembly comprises a first lens barrel and at least one first lens, the second sub-assembly comprises a second sub-lens assembly and a photosensitive assembly fixed together, the second sub-lens assembly comprises a second lens barrel and at least one second lens, and the photosensitive assembly comprises a photosensitive element;

arranging the first sub-lens assembly on an optical axis of the second sub-lens assembly to form an optical system capable of imaging and comprising the at least one first lens and the at least one second lens;

adjusting a relative position of the first sub-lens assembly with respect to the second sub-lens assembly, so as to increase an actual measured resolution of imaging of the optical system, obtained by using the photosensitive element, to a first threshold, and decrease an actual measured image plane inclination obtained by using the photosensitive element to a second threshold; and connecting the first sub-lens assembly and the second sub-lens assembly, so that the relative position of the first sub-lens assembly and the second sub-lens assembly remain unchanged.

Wherein, in the step of adjusting the relative position of the first sub-lens assembly with respect to the second sub-lens assembly, the adjustment of the relative position comprises:

increasing the actual measured resolution of imaging of the optical system by moving the first sub-lens assembly with respect to the second sub-lens assembly in an adjustment plane.

Wherein, in the step of adjusting the relative position of the first sub-lens assembly with respect to the second sub-lens assembly, the movement in the adjustment plane comprises translation and/or rotation in the adjustment plane.

Wherein, in the step of adjusting the relative position of the first sub-lens assembly with respect to the second sub-lens assembly, the adjustment of the relative position comprises: adjusting an angle of an axis of the first sub-lens assembly with respect to an axis of the second sub-lens assembly.

Wherein, the steps to adjust the relative position of the first sub-lens assembly with respect to the second sub-lens assembly comprise the following sub-steps:

moving the first sub-lens assembly with respect to the second sub-lens assembly in an adjustment plane, so as to increase actual measured resolution of imaging of the optical system in a reference field, obtained by using the photosensitive element, to a corresponding threshold; and adjusting an angle of an axis of the first sub-lens assembly with respect to an axis of the second sub-lens assembly, so as to increase actual measured resolution of imaging of the optical system in a test field, obtained by using the photosensitive element, to a corresponding threshold, and decrease an actual measured image plane inclination in the test field, obtained by using the photosensitive element, to the second threshold.

Wherein, the steps of adjusting the relative position of the first sub-lens assembly with respect to the second sub-lens assembly further comprise:

moving the first sub-lens assembly with respect to the second sub-lens assembly in a direction z, so that an actual measured image plane of imaging of the optical system, obtained by using the photosensitive element, matches a target surface, wherein the direction z is a direction along the optical axis.

Wherein, the adjustment plane is perpendicular to the direction z.

Wherein, a method for obtaining the actual measured image plane inclination comprises:

setting a plurality of targets corresponding to different test positions in the test field; and acquiring a resolution defocusing curve corresponding to each test position based on an image output by the photosensitive assembly.

Wherein, the reaching of the second threshold is to make the position offset of the peak values of the resolution defocusing curves corresponding to different test positions in the test field along the optical axis direction reduce to the said second threshold.

Wherein, the reaching of the second threshold is to make the position offset of the peak values of the resolution defocusing curves corresponding to different test positions in the test field along the optical axis direction reduce to a range of +/−5 μm.

Wherein, a method for obtaining the actual measured resolution of imaging of the optical system comprises:

setting a plurality of targets corresponding to different test positions in the reference field and the test field; and acquiring a resolution defocusing curve corresponding to each test position based on an image output by the photosensitive assembly.

Wherein, in the sub-step of moving the first sub-lens assembly with respect to the second sub-lens assembly in an adjustment plane, the reaching of the corresponding threshold is: increasing peaks of resolution defocusing curves corresponding to different test positions in the reference field to a corresponding threshold.

Wherein, in the sub-step of adjusting an angle of an axis of the first sub-lens assembly with respect to an axis of the second sub-lens assembly, the reaching of the corresponding threshold comprises: increasing a smallest one of peaks of a plurality of resolution defocusing curves corresponding to different test positions in the test field to a corresponding threshold.

Wherein, the step of adjusting the relative position of the first sub-lens assembly with respect to the second sub-lens assembly comprises the following sub-steps:

moving the first sub-lens assembly with respect to the second sub-lens assembly within a first range in the adjustment plane, so as to increase actual measured resolution of imaging of the optical system in a reference field, obtained by using the photosensitive element, to a corresponding threshold;

and then adjusting an angle of an axis of the first sub-lens assembly with respect to an axis of the second sub-lens assembly, so as to increase actual measured resolution of imaging of the optical system in a test field, obtained by using the photosensitive element, to a corresponding threshold, and decrease an actual measured image plane inclination in the test field obtained by using the photosensitive element; and if the actual measured image plane inclination cannot reach the second threshold, further performing a readjustment step until the actual measured image plane inclination is decreased to the second threshold.

Wherein, the readjustment step comprises:

moving the first sub-lens assembly with respect to the second sub-lens assembly within a second range in the adjustment plane, wherein the second range is smaller than the first range; and adjusting an angle of a central axis of the first sub-lens assembly with respect to a central axis of the second sub-lens assembly, so as to decrease the actual measured image plane inclination of imaging of the optical system obtained by using the photosensitive element.

Wherein, in the connecting step, the first sub-lens assembly and the second sub-lens assembly are connected by a bonding or welding process.

Wherein, the welding process comprises laser welding or ultrasonic welding.

Wherein, in the steps for preparing the first sub-lens assembly and the second sub-assembly, the second sub-lens assembly and the photosensitive assembly are fixed by non-active alignment, to form the second sub-assembly. The non-active alignment manner refers to a manner other than active alignment, for example, an alignment manner that does not require lighting up a module chip, such as mechanical alignment. The active alignment may be abbreviated as AA.

According to another aspect of the present invention, a camera module is further provided, comprising:

a first sub-lens assembly, comprising a first lens barrel and at least one first lens; and a second sub-assembly, comprising a second sub-lens assembly and a photosensitive assembly fixed together, wherein the second sub-lens assembly comprises a second lens barrel and at least one second lens, and the photosensitive assembly comprises a photosensitive element, wherein the first sub-lens assembly is arranged on an optical axis of the second sub-lens assembly to form an optical system capable of imaging and comprising the at least one first lens and the at least one second lens;

and the first sub-lens assembly and the second sub-lens assembly are fixed together by a connecting medium, and the connecting medium is adapted to cause a central axis of the first sub-lens assembly to have an angle of inclination with respect to an axis of the second sub-lens assembly.

Wherein, the connecting medium is further adapted to cause the central axis of the first sub-lens assembly to be staggered with respect to the central axis of the second sub-lens assembly.

Wherein, the connecting medium is further adapted to cause the first sub-lens assembly and the second sub-lens assembly to have a structural clearance therebetween.

Wherein, the connecting medium is a bonding medium or a welding medium.

Wherein, the central axis of the first sub-lens assembly is staggered with respect to the central axis of the second sub-lens assembly by 0 to 15 µm.

Wherein, the central axis of the first sub-lens assembly has an angle of inclination of smaller than 0.5° with respect to the central axis of the second sub-lens assembly.

Wherein, the connecting medium is further adapted to cause a relative position of the first sub-lens assembly and the second sub-lens assembly to remain unchanged, and the relative position cause actual measured resolution of imaging of the optical system, obtained by using the photosensitive element, to be increased to a first threshold, and cause an actual measured image plane inclination of imaging of the optical system, obtained by using the photosensitive element, to be decreased to a second threshold.

Wherein, the second sub-lens assembly further comprises a motor, the actual measured resolution is obtained when the motor is in on state, and the actual measured image plane inclination is obtained when the motor is in on state.

Wherein, outer side surfaces of the first sub-lens assembly and the second sub-lens assembly both have a contact surface facilitating pick-up.

A clearance between 10 µm and 50 µm exists between the second sub-lens assembly and the photosensitive assembly.

Compared with the prior art, the present invention has at least one of the following technical effects.

In the present invention, the resolution of the camera module can be improved.

In the present invention, the capability of process index (CPK) of mass production of the camera module can be improved.

In the present invention, the requirements on the precision of various elements of the optical imaging lens assembly and module and its assembly precision can be lowered, and the overall costs of the optical imaging lens assembly and module can be reduced.

In the present invention, the real-time adjustment of various aberrations of the camera module during the assembly process can be implemented, so as to reduce the failure rate and the production costs, and improve the imaging quality.

In the present invention, the relative position of the first sub-lens assembly and the second sub-assembly are adjusted over multiple degrees of freedom, so that aberration adjustment of the entire module can be implemented at a time, thereby improving the imaging quality of the entire module.

In the present invention, the photosensitive assembly and the second sub-lens assembly can be fixed by means of non-active alignment, thereby reducing the costs and improving the production efficiency.

BRIEF DESCRIPTION OF THE DRAWINGS

Exemplary embodiments are shown in the accompanying drawings. The embodiments and accompanying drawings disclosed herein are provided for the purpose of description, and should not be construed as limiting.

DETAILED DESCRIPTION OF EMBODIMENTS

Figure 1:
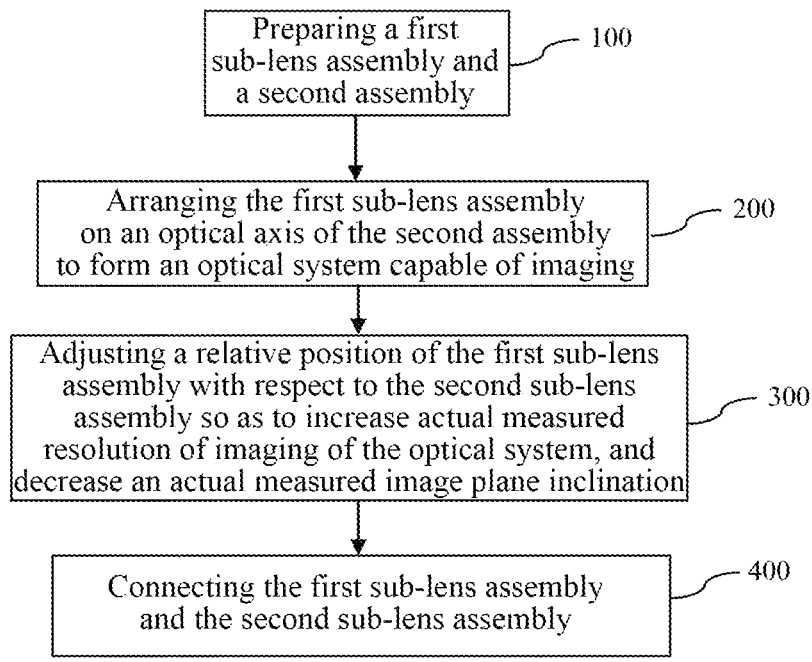
FIG. 1 is a flow chart of a method for assembling a camera module according to an embodiment of the present invention.

To facilitate the understanding of the present application, various aspects of the present application will be described in further detail with reference to the accompanying drawings. It should be understood that these detailed descriptions merely describe exemplary implementations of the present application, and are not intended to limit the scope of the present application in any way. Throughout this specification, same reference numerals denote same parts. The term "and/or" includes any and all combinations of one or more of the associated listed items.

It should be noted that in this specification, the terms such as "first" and "second" are merely used for distinguishing one feature from another, and are not intended to impose any limitation on the features. Therefore, a first subject discussed below may also be referred to a second subject without departing from the teaching of the present application.

In the accompanying drawings, for the convenience of illustration, the thicknesses, sizes, and shapes of objects are slightly exaggerated. The accompanying drawings are illustrative only and are not drawn strictly to scale.

It will be further understood that the terms "comprises," "comprising," "having," "includes," and/or "including," when used in this specification, specify the presence of stated features, steps, operations, elements, and/or components, but do not preclude the presence or addition of one or more other features, steps, operations, elements, components, and/or groups thereof. In addition, expressions such as "at least one of," when preceding a list of elements, modify the entire list of features, rather than individual elements in the list. Moreover, when the implementations of the present application are described, the term "may" is used to indicate "one or more implementations of the present application". Furthermore, the term "exemplary" is used to refer to illustrative description or description by way of example.

As used herein, the terms "substantially", "about", and similar terms are used as terms of approximation and not as terms of degree, and are intended to account for the inherent deviations in measured or calculated values that would be identified by those of ordinary skill in the art.

Unless otherwise defined, all terms (including technical and scientific terms) used herein have the same meaning as commonly understood by those of ordinary skill in the art to which the present application belongs. It will be further understood that terms, such as those defined in commonly used dictionaries, should be interpreted as having a meaning consistent with their meaning in the context of the relevant art and will not be interpreted in an idealized or overly formal sense unless expressly so defined herein.

It should be noted that the embodiments of the present application and the features in the embodiments may be combined with each other on a non-conflict basis. The present application will be described below in detail with reference to the accompanying drawings and in combination with the embodiments.

FIG. 1 is a flow chart of a method for assembling a camera module according to an embodiment of the present invention. Referring to FIG. 1, the method includes steps 100 to 400.

Figure 2:
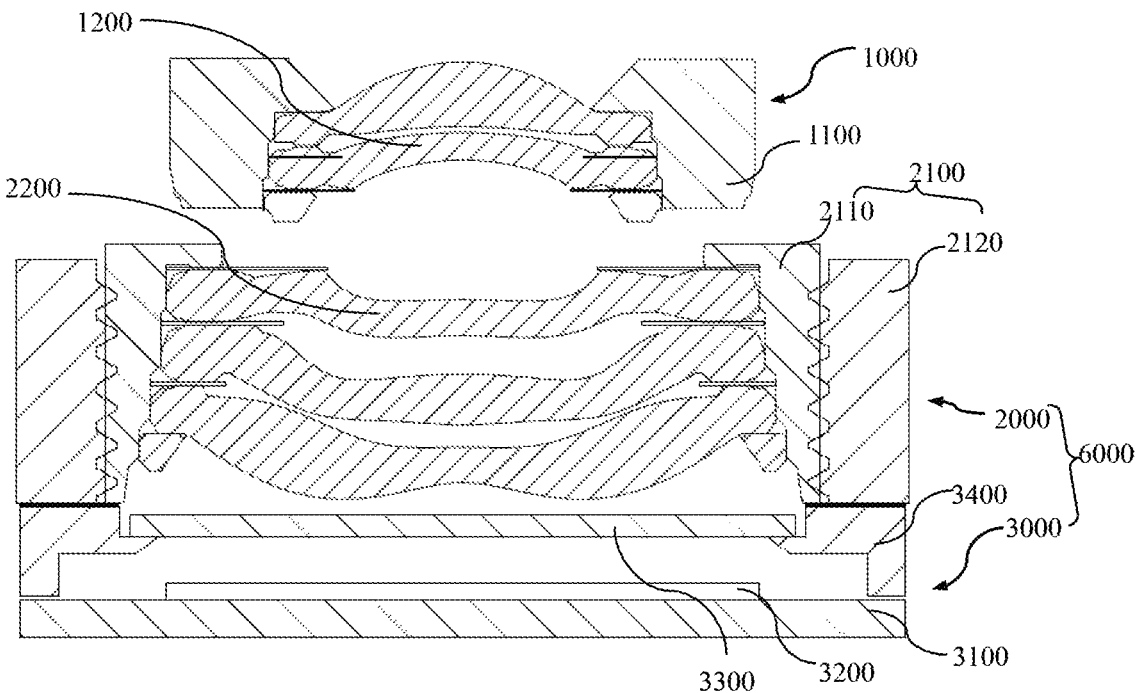
FIG. 2 is a schematic diagram illustrating a first sub-lens assembly, a second sub-assembly and their initial positions according to an embodiment of the present invention.

In step 100, a first sub-lens assembly and a second sub-assembly are prepared. FIG. 2 is a schematic diagram illustrating a first sub-lens assembly 1000, a second sub-assembly 6000 and their initial positions according to an embodiment of the present invention. Referring to FIG. 2, the first sub-lens assembly 1000 includes a first lens barrel 1100 and at least one first lens 1200. In this embodiment, the number of the first lenses 1200 is two. However, it should be readily understood that in other embodiments, the number of the first lenses 1200 may also have other values, for example, one, three, or four.

The second sub-assembly 6000 includes a second sub-lens assembly 2000 and a photosensitive assembly 3000 fixed together. The second sub-lens assembly 2000 includes a second lens barrel 2100 and at least one second lens 2200. In this embodiment, the number of the second lenses 2200 is three. However, it should be readily understood that in other embodiments, the number of the second lenses 2200 may also have other values, for example, one, two, or four. In this embodiment, the second lens barrel 2100 of the second sub-lens assembly 2000 includes an inner lens barrel 2110 and an outer lens barrel 2120 (where the outer lens barrel 2120 may also be referred to as a lens base) nested together. The inner lens barrel 2110 and the outer lens barrel 2120 are threadedly connected. It should be noted that the threaded connection is not the only way for connecting the inner lens barrel 2110 and the outer lens barrel 2120. Definitely, it should be readily understood that in other embodiments, the second lens barrel 2100 may be an integral lens barrel.

Still referring to FIG. 2, in an embodiment, the photosensitive assembly 3000 includes a circuit board 3100, a photosensitive element 3200 mounted on the circuit board 3100, a tubular support 3400 fabricated on the circuit board 3100 and surrounding the photosensitive element 3200, and a filter element 3300 mounted on the support 3400. The tubular support 3400 has an extension portion that extends inward (toward the photosensitive element 3200) and that can serve as a lens bracket, and the filter element 3300 is mounted on the extension portion. The tubular support 3400 further has an upper surface, and the photosensitive assembly may be connected to other components (for example, the second sub-lens assembly 2000) of the camera module via the upper surface. Definitely, it should be readily understood that in other embodiments, the photosensitive assembly 3000 may be of other structures. For example, the circuit board of the photosensitive assembly has a through hole, and the photosensitive element is mounted in the through hole of the circuit board. For another example, a supporting portion is formed around the photosensitive element by molding, and extends inward to come into contact with the photosensitive element (for example, the supporting portion covers at least one part of a non-photosensitive area that is located at an edge of the photosensitive element). For still another example, the photosensitive assembly may not include the filter element.

Further, in an embodiment, the second sub-lens assembly 2000 and the photosensitive assembly 3000 are fixed by means of non-active alignment, to form the second sub-assembly 6000. The active alignment may be abbreviated as AA. The non-active alignment manner refers to a manner other than active alignment. For example, in an implementation, the second sub-lens assembly 2000 and the photosensitive assembly 3000 may be fixed together by using a mechanical alignment manner, to form the second sub-assembly 6000.

In step 200, the first sub-lens assembly 1000 is arranged on an optical axis of the second sub-assembly 6000 to form an optical system capable of imaging and including the at least one first lens 1200 and the at least one second lens 2200. In this step, arranging the first sub-lens assembly 1000 on the optical axis of the second sub-assembly 6000 means preliminarily aligning the two, to form an optical system capable of imaging. That is to say, as long as the optical system including all the first lenses 1200 and all the second lenses 2200 is capable of imaging, it may be considered that the arrangement work in this step is complete. It should be noted that due to various fabrication tolerances of the sub-lens assembly and the photosensitive assembly during fabrication or other reasons, the central axes of the first lens barrel 1100 and the second lens barrel 2100 may not coincide with the optical axis after the arrangement is completed.

In step 300, a relative position of the first sub-lens assembly 1000 with respect to the second sub-lens assembly 2000 is adjusted, so as to maximize an actual measured resolution of imaging of the optical system (where when the actual measured resolution is increased to a preset threshold, it may be considered that the actual measured resolution is maximized), and minimize an actual measured image plane inclination of imaging of the optical system that is obtained by using the photosensitive element (where when the actual measured image plane inclination is decreased to a preset threshold, it may be considered that the actual measured image plane inclination is minimized). The adjustment of the relative position of the first sub-lens assembly 1000 and the second sub-lens assembly 2000 may be performed over multiple degrees of freedom.

Figure 3:
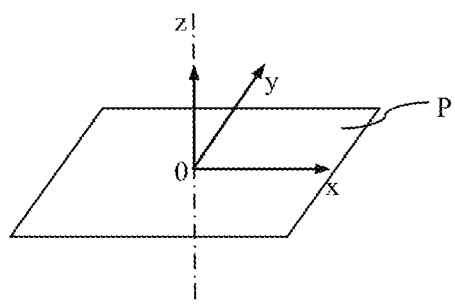
FIG. 3 illustrates a relative position adjustment method according to an embodiment of the present invention.

FIG. 3 illustrates a relative position adjustment method according to an embodiment of the present invention. According to this adjustment method, the first sub-lens assembly 1000 may be moved with respect to the second sub-lens assembly 2000 in directions x, y, and z (that is, the adjustment of relative position in this embodiment can be performed in three degrees of freedom). The direction z is a direction along the optical axis, and the directions x and y are directions perpendicular to the optical axis. The directions x and y are both located in an adjustment plane P, and translation in the adjustment plane P can be decomposed into two components in the directions x and y.

Figure 4:
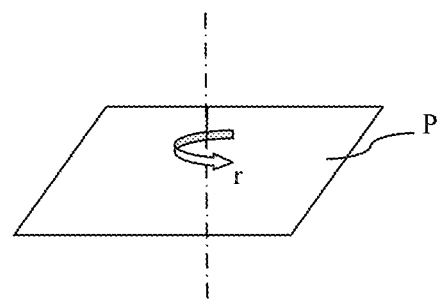
FIG. 4 illustrates a rotational adjustment according to another embodiment of the present invention.

FIG. 4 illustrates a rotational adjustment according to another embodiment of the present invention. In this embodiment, the adjustment of relative position can be not only performed in the three degrees of freedom shown in FIG. 3, but also performed in a rotational degree of freedom, that is, adjustment in a direction r. In this embodiment, the adjustment in the direction r is rotation in the adjustment plane P, that is, rotation about an axis perpendicular to the adjustment plane P.

Figure 5:
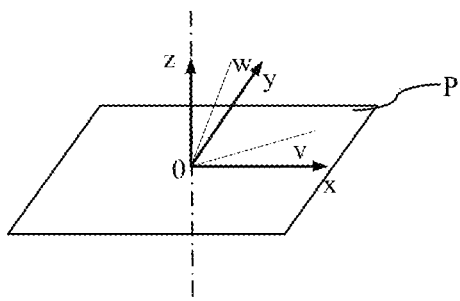
FIG. 5 illustrates a relative position adjustment method further allowing for adjustment in directions v and w according to still another embodiment of the present invention.

Further, FIG. 5 illustrates a relative position adjustment method further allowing for adjustment in directions v and w according to still another embodiment of the present invention. In FIG. 5, the direction v represents an angle of rotation in the xoz plane, the direction w represents an angle of rotation in the yoz plane, and the angles of rotation in the direction v and the direction w may form a vector angle, which represents the overall inclination state. That is to say, the inclination posture of the first sub-lens assembly with respect to the second sub-lens assembly (that is, the inclination of the optical axis of the first sub-lens assembly with respect to the optical axis of the second sub-lens assembly) may be adjusted by adjustment in the direction v and the direction w.

Adjustment over the above-mentioned six degrees of freedom in the directions x, y, z, r, v, and w may all affect the imaging quality of the optical system (for example, the value of the resolution). In other embodiments of the present invention, the method for adjusting the relative position may be performed in any one of, or any two or more of the above-mentioned six degrees of freedom.

Further, in an embodiment, a method for obtaining the actual measured resolution of imaging of the optical system includes steps 301 and 302.

In step 301, a plurality of targets corresponding to a reference field and/or a test field is set. For example, a center field may be selected as the reference field, and one or more fields corresponding to a region of interest may be selected as the test field (for example, 80% field).

In step 302, a resolution defocusing curve corresponding to each target is acquired based on an image output by the photosensitive assembly. According to the resolution defocusing curve, actual measured resolution of the corresponding field can be obtained.

Figure 6:
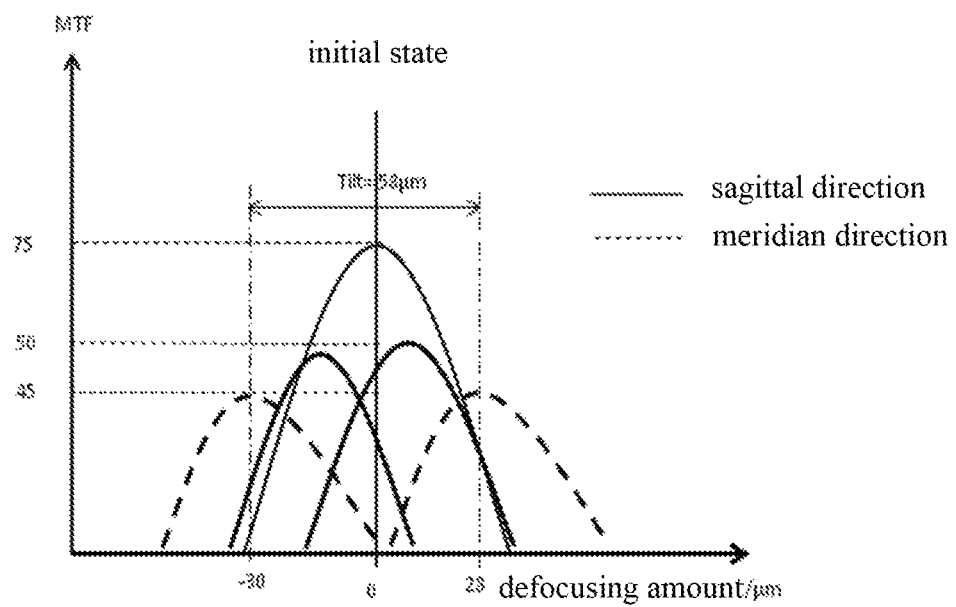
FIG. 6 illustrates MTF defocusing curves in an initial state according to an embodiment of the present invention.

In this embodiment, the resolution may be represented by a modulation transfer function (MTF). A larger MTF value indicates higher resolution. In this way, according to the MTF defocusing curve acquired based on the image output by the photosensitive assembly, the resolution of imaging of the optical system can be obtained in real time. According to the variation of the MTF defocusing curve, it can be determined whether a maximum resolution has been reached currently. FIG. 6 illustrates MTF defocusing curves in an initial state according to an embodiment of the present invention, including an MTF defocusing curve of the center field and MTF defocusing curves of imaging of two targets located in the test field in a sagittal direction and a meridian direction.

Figure 9:
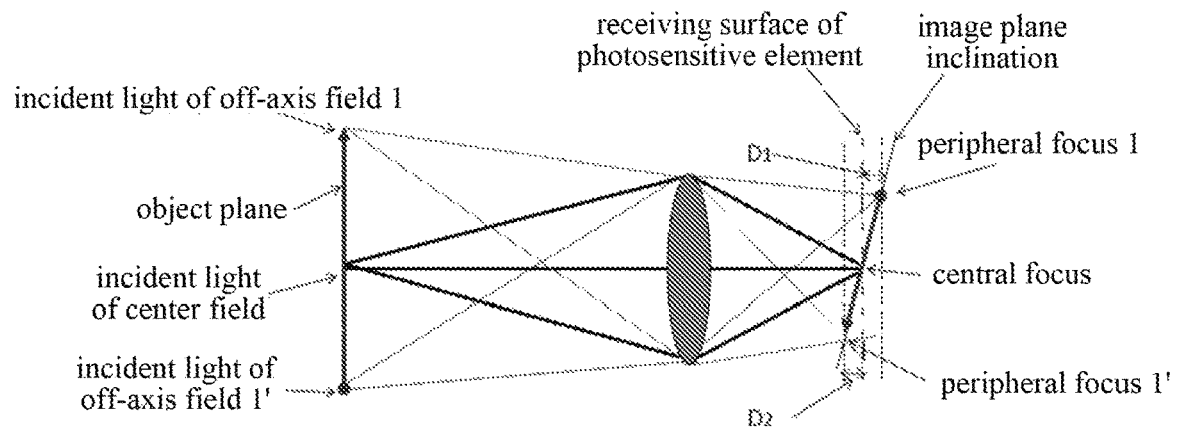
FIG. 9 is a schematic diagram of an image plane inclination.
Figure 10:
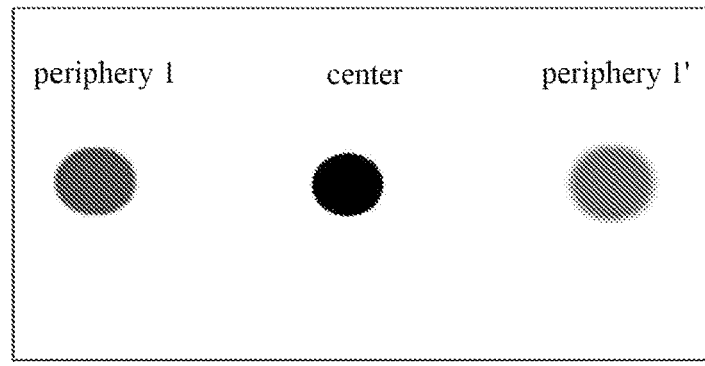
FIG. 10 is a schematic diagram of comparison of images at a central position, a periphery 1, and a periphery 1'.

On the other hand, an image plane inclination often occurs during imaging of the optical system. FIG. 9 is a schematic diagram of an image plane inclination. It can be seen that in FIG. 9, an object plane perpendicular to the optical axis forms an inclined image plane after lens imaging. Incident light of the center field is focused at a central focus after passing through a lens. Incident light of an off-axis field 1 is focused at a peripheral focus 1' after passing through the lens, where there is an axial deviation D2 between the peripheral focus 1' and the central focus. Incident light of an off-axis field 1' is focused at a peripheral focus 1 after passing through the lens, where there is an axial deviation D1 between the peripheral focus 1 and the central focus. As a result, when the receiving surface of the photosensitive element is disposed perpendicularly to the optical axis, clear imaging cannot be achieved at the periphery 1 and the periphery 1'. FIG. 10 is a schematic diagram of comparison of images at the central position, the periphery 1, and the periphery 1'. It can be seen that images at the periphery 1 and the periphery 1' are obviously more blurred than the image at the central position. In the present invention, the angle of inclination between the first sub-lens assembly and the second sub-lens assembly may be adjusted to compensate for the above-mentioned image plane inclination.

In an embodiment, a method for acquiring the actual measured image plane inclination includes steps 303 and 304.

Figure 14:
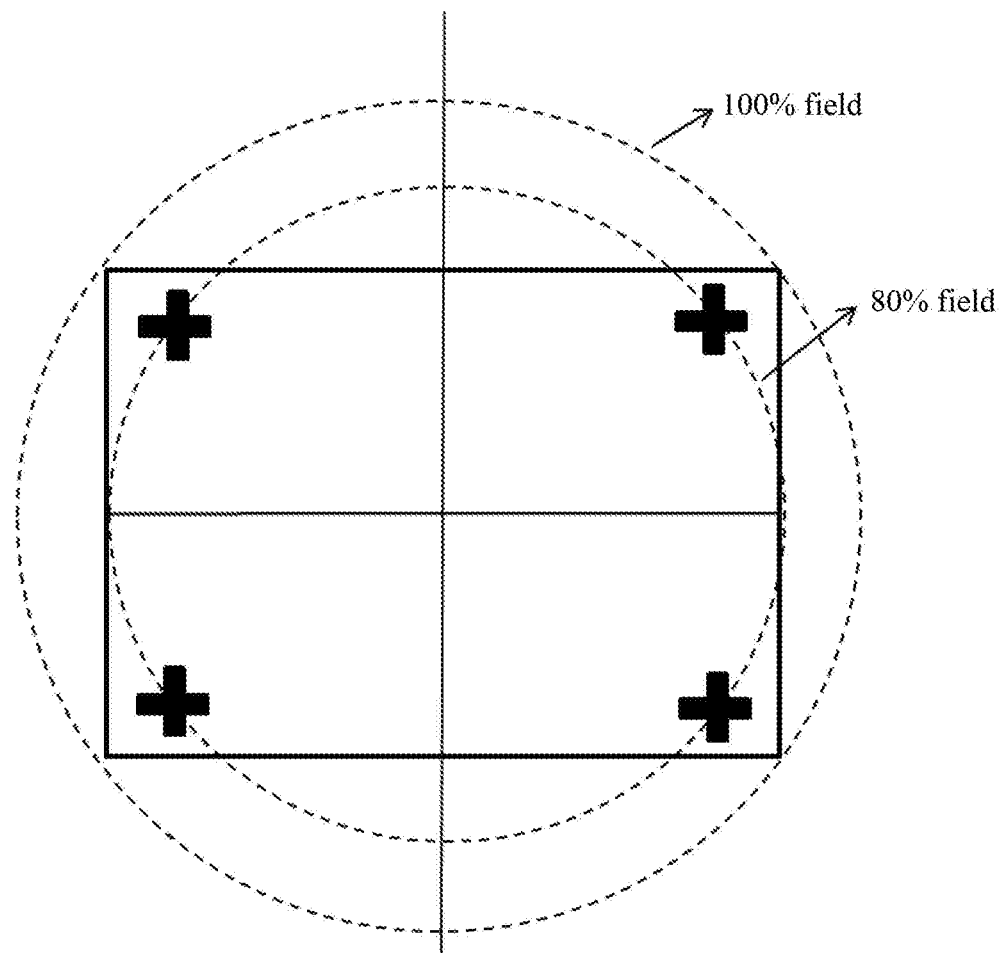
FIG. 14 illustrates an example of targets setting according to an embodiment.

In step 303, for any test field (for example, 80% field), a plurality of targets corresponding to different test positions in the test field is set. FIG. 14 illustrates an example of a target setting method according to an embodiment. As shown in FIG. 14, the test field is 80% field, and four targets are respectively disposed at four corners of a chart.

In step 304, each resolution defocusing curve corresponding to different positions in a same field is acquired based on an image output by the photosensitive assembly. When the resolution defocusing curves converge on the abscissa axis (the coordinate axis representing a defocusing amount along the optical axis direction), it indicates that the image plane inclination corresponding to the test field has been compensated for. That is, the minimization of the actual measured image plane inclination has been achieved in the test field. In an embodiment, if a position offset in the optical axis direction between peaks of resolution defocusing curves corresponding to different test positions in a test field are decreased to a preset threshold, it indicates that the image plane inclination corresponding to the test field has been compensated for.

Further, in an embodiment, step 300 includes steps 310 and 320.

In step 310, the actual measured resolution of imaging of the optical system is increased to a corresponding threshold by moving the first sub-lens assembly 1000 with respect to the second sub-lens assembly 2000 in an adjustment plane P. The adjustment over six degrees of freedom in the directions x, y, z, r, v, and w has been described above. Translation in the directions x and y and rotation in the direction r may be considered to be movement in the adjustment plane P in this step. In this step, a plurality of targets corresponding to the reference field and the test field is set, and then a resolution defocusing curve corresponding to each target is acquired based on an image output by the photosensitive assembly. The first sub-lens assembly 1000 is moved with respect to the second sub-lens assembly 2000 in the directions x, y, and r, so that a peak of a resolution defocusing curve corresponding to imaging of a target in the reference field is increased to a corresponding threshold. The center field may be used as the reference field. However, it should be noted that the reference field is not limited to the center field. In some embodiments, other fields may also be selected as the reference field. In this step, increasing the actual measured resolution to a corresponding threshold is: increasing a peak of a resolution defocusing curve corresponding to imaging of a target in the reference field to a corresponding threshold.

Figure 7:
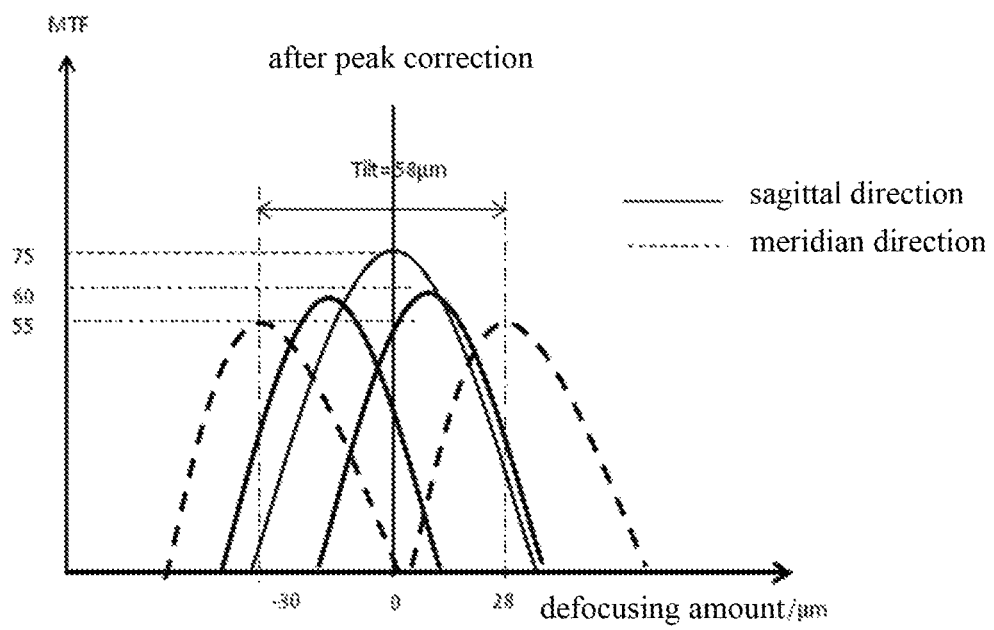
FIG. 7 illustrates an example of MTF defocusing curves after adjustment in step 310.
Figure 8:
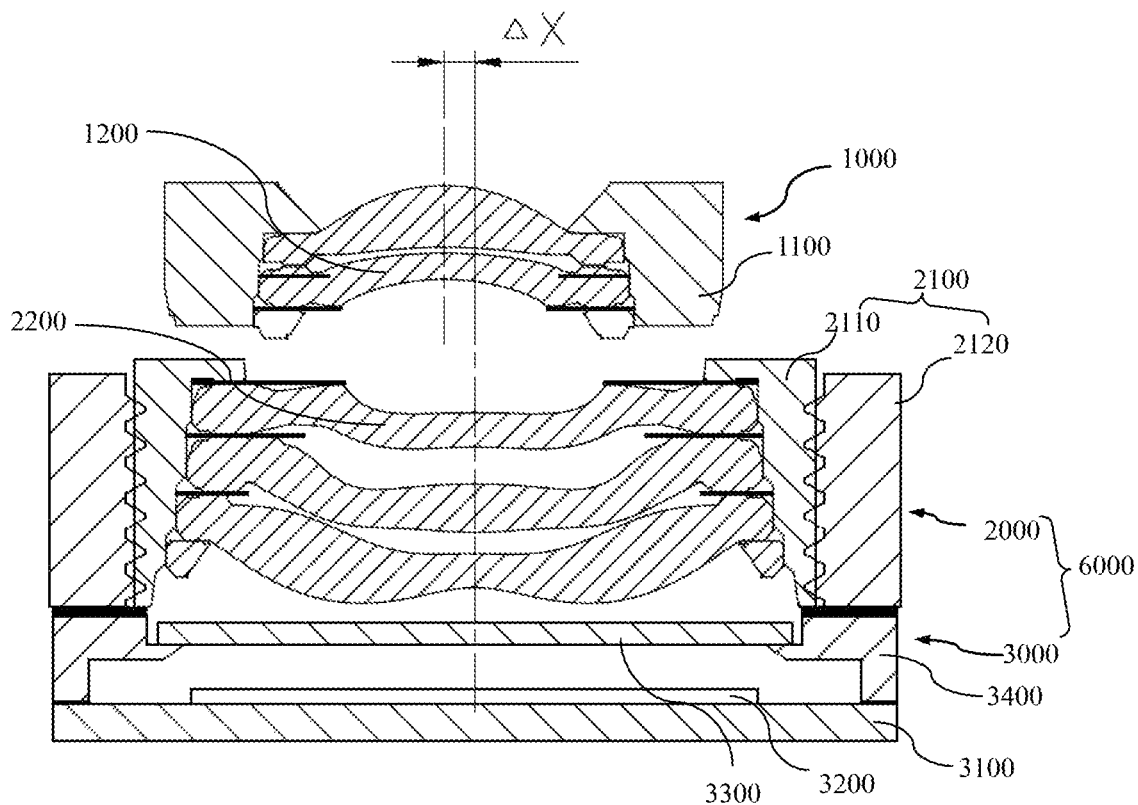
FIG. 8 illustrates the first sub-lens assembly, the second sub-assembly and a positional relationship thereof after adjustment in step 310 according to an embodiment of the present invention.

FIG. 7 illustrates an example of MTF defocusing curves after adjustment in step 310. It can be seen that after the adjustment, MTF values of imaging of the two targets in the sagittal direction and the meridian direction both increase obviously. FIG. 8 illustrates the first sub-lens assembly 1000, the second sub-assembly 6000 and a positional relationship thereof after adjustment in step 310 according to an embodiment of the present invention. It can be seen that the central axis of the first sub-lens assembly 1000 is offset with respect to the central axis of the second sub-lens assembly 2000 in the direction x by Δx. It should be noted that FIG. 8 is merely exemplary. Although no offset in the direction y is shown in FIG. 8, it should be readily understood by those skilled in the art that the central axis of the first sub-lens assembly 1000 may also be offset with respect to the central axis of the second sub-lens assembly 2000 in the direction y by Δy.

In step 320, the axis of the first sub-lens assembly 1000 is tilted with respect to the axis of the second sub-lens assembly 2000, so as to increase the actual measured resolution of imaging of the optical system in the test field to a corresponding threshold, and decrease the actual measured image plane inclination of imaging of the optical system in the test field to a corresponding threshold. Rotation in the directions v and w corresponds to the tilting adjustment in this step. In this step, increasing the actual measured resolution to a corresponding threshold includes: increasing the smallest one of peaks of resolution defocusing curves corresponding to imaging of a plurality of targets of different test positions in the test field to a corresponding threshold. In other embodiments, increasing the actual measured resolution to a corresponding threshold may further include: increasing uniformity of the peaks of the resolution defocusing curves corresponding to imaging of the plurality of targets of different test positions in the test field to a corresponding threshold. Increasing the uniformity of the peaks includes: decreasing a variance of the peaks of the resolution defocusing curves corresponding to imaging of the plurality of targets in the test field to a corresponding threshold. Decreasing the actual measured image plane inclination of imaging of the optical system in the test field to a corresponding threshold includes: making a position offset of the peak values of the resolution defocusing curves corresponding to different test positions in the test field along the optical axis direction reduce to the corresponding threshold.

Figure 11:
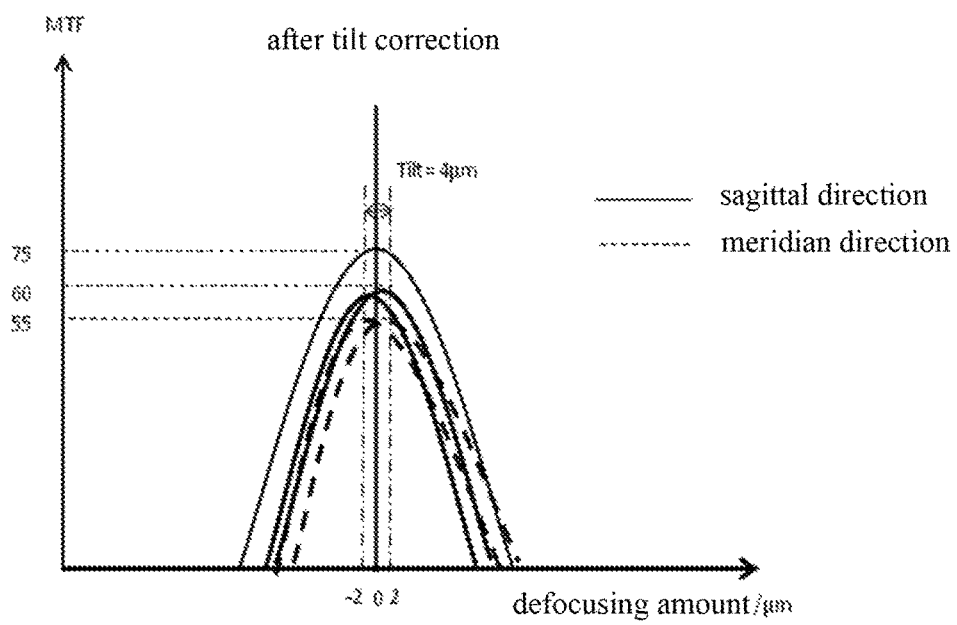
FIG. 11 illustrates MTF defocusing curves after adjustment in step 400 according to an embodiment of the present invention.
Figure 12:
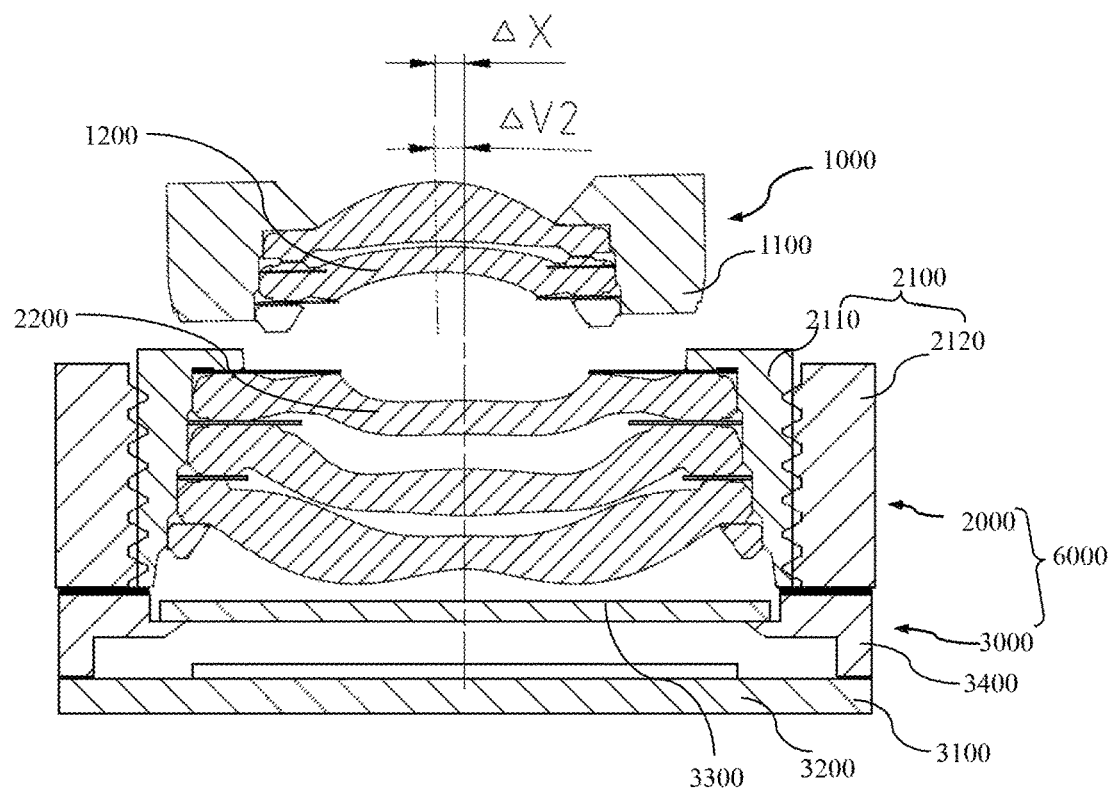
FIG. 12 illustrates a relative position of the first sub-lens assembly and the second sub-lens assembly after adjustment in step 320 according to an embodiment of the present invention.

FIG. 11 illustrates MTF defocusing curves after adjustment in step 320 according to an embodiment of the present invention. FIG. 12 illustrates a relative position of the first sub-lens assembly and the second sub-lens assembly after adjustment in step 320 according to an embodiment of the present invention. It can be seen in FIG. 12 that, the central axis of the first sub-lens assembly is offset with respect to the central axis of the second sub-lens assembly in the direction x by Δx, and the central axis of the first sub-lens assembly 1000 is also inclined with respect to the central axis of the second sub-lens assembly 2000 by Δv2. Although no inclination in the direction w is shown in FIG. 12, it should be readily understood by those skilled in the art that the axis of the photosensitive assembly 3000 may also have an angle of inclination with respect to the central axis of the second sub-lens assembly 2000 in the direction w.

Figure 13:
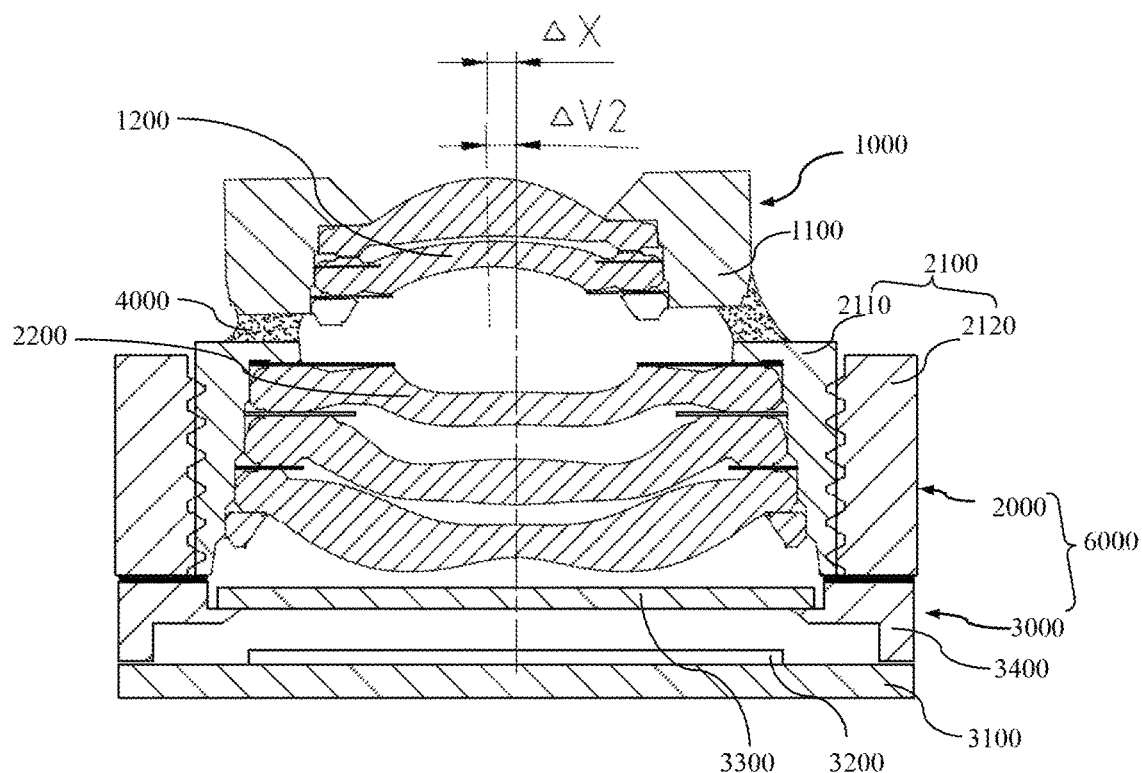
FIG. 13 illustrates a camera module formed after a connecting step is performed according to an embodiment of the present invention.

In step 400, the first sub-lens assembly 1000 and the second sub-lens assembly 2000 are connected, so that the relative position of the first sub-lens assembly 1000 and the second sub-lens assembly 2000 remain unchanged. FIG. 13 illustrates a camera module formed after a connecting step is performed according to an embodiment of the present invention.

The process for connecting the first sub-lens assembly and the second sub-lens assembly may be selected as required. For example, in an embodiment, the first sub-lens assembly and the second sub-lens assembly are connected by a bonding process. As shown in FIG. 13, in this embodiment, the first sub-lens assembly 1000 and the second sub-lens assembly 2000 are bonded by using an adhesive material 4000. In another embodiment, the first sub-lens assembly and the second sub-lens assembly may be connected by a laser welding process. In still another embodiment, the first sub-lens assembly and the second sub-lens assembly may be connected by an ultrasonic welding process. In addition to the above-mentioned processes, other welding processes may also be used. It should be noted that in the present invention, the term "connection" is not limited to direct connection. For example, in an embodiment, the first sub-lens assembly and the second sub-lens assembly may be connected via an intermediate member (which may be rigid). Such connection via an intermediate member falls within the meaning of the term "connection" as long as the relative position of (including relative distance and posture) of the first sub-lens assembly and the second sub-lens assembly (or the photosensitive assembly and the second sub-lens assembly) remain unchanged.

The method for assembling a camera module according to the above-mentioned embodiment can improve the resolution of the camera module and the capability of process index (CPK) of mass production of the camera module; can lower the requirements on the precision of various elements of the optical imaging lens assembly and module and its assembly precision, and reduce the overall costs of the optical imaging lens assembly and module. The method can implement a real-time adjustment of various aberrations of the camera module during the assembly process to reduce the fluctuation of the imaging quality, thereby reducing the failure rate and the production costs, and improving the imaging quality.

Further, in an embodiment, step 300 may further include: matching an actual measured image plane of imaging of the optical system with a target surface by moving the first sub-lens assembly with respect to the second sub-lens assembly in the optical axis direction. The adjustment over six degrees of freedom in the directions x, y, z, r, v, and w has been described above. Movement in the direction z may be considered to be movement in the optical axis direction in this step.

After the optical lens assembly is assembled, an expected imaging surface will be obtained. Herein, the expected imaging surface is referred to as the target surface. In some cases, the target surface is a plane. For example, to achieve optimal imaging quality, if the photosensitive surface of the photosensitive element of the camera module corresponding to the optical lens assembly is a plane, the expected imaging surface of the optical lens assembly is also a plane. That is to say, the target surface is a plane. In some other cases, the target surface may be a convex or concave curved surface, or a corrugated curved surface. For example, to achieve optimal imaging quality, if the photosensitive surface of the photosensitive element of the camera module corresponding to the optical lens assembly is a convex or concave curved surface, the target surface should also be a convex or concave curved surface; if the photosensitive surface of the photosensitive element of the camera module corresponding to the optical lens assembly is a corrugated curved surface, the target surface should also be a corrugated curved surface.

In an embodiment, it is identified according to an image output by the photosensitive element whether the actual measured image plane matches the target surface. In the step of matching the actual measured image plane with the target surface, matching the actual measured image plane with the target surface includes: obtaining an actual measured field curvature of the module according to the image output by the photosensitive element, and causing the actual measured field curvature of the module to fall within a range of +/−5 μm. This embodiment can further improve the imaging quality of the camera module.

Further, in an embodiment, in step 320, targets are set in pair for the selected test field. For example, a pair of first targets respectively located at two ends of the central position are set in a first direction, and a pair of second targets respectively located at two ends of the central position are set in a second direction. As shown in FIG. 14, the test field is 80% field, and the four targets are respectively disposed at four corners of a chart. The lower left target and the upper right target may be used as the pair of first targets in the first direction, and the upper left target and the lower right target may be used as the pair of second targets in the second direction. An inclination component of the actual measured image plane of imaging of the optical system in the first direction can be identified according to an offset vector of a resolution defocusing curve of the pair of first targets in the abscissa axis direction (that is, the optical axis direction), and an inclination component of the actual measured image plane of imaging of the optical system in the second direction can be identified according to an offset vector of a resolution defocusing curve of the pair of second targets in the abscissa axis direction. Then, the posture of the first sub-lens assembly with respect to the second sub-lens assembly is adjusted to change the angle of the axis of the first sub-lens assembly with respect to the axis of the second sub-lens assembly, so as to compensate for the inclination component in the first direction and the inclination component in the second direction.

Further, in an embodiment, in step 310, the first sub-lens assembly is moved with respect to the second sub-lens assembly within a first range in the adjustment plane.

In step 320, if the actual measured image plane inclination cannot be decreased to fall within a preset range, a readjustment step 330 is further performed until the actual measured image plane inclination is decreased to fall within the preset range.

The readjustment step 330 includes step 331 and 332.

In step 331, the first sub-lens assembly is moved with respect to the second sub-lens assembly within a second range in the adjustment plane. The second range is smaller than the first range. That is to say, compared with step 310, in step 331, the relative position of the first sub-lens assembly and the second sub-lens assembly are adjusted within a small range in the adjustment plane. On one hand, because the adjustment range is small, the actual measured resolution achieved after the adjustment in step 310 can basically be maintained. On the other hand, the image plane inclination can be reduced, making it easier to compensate for the image plane inclination in step 332.

In step 332, the angle of the central axis of the first sub-lens assembly with respect to the central axis of the second sub-lens assembly is adjusted, so that an actual measured image plane inclination of imaging of the optical system, obtained by using the photosensitive element, is decreased to a corresponding threshold. If the actual measured image plane inclination cannot be decreased to fall within the preset range, the above-mentioned steps 331 and 332 are repeated until the actual measured image plane inclination is decreased to fall within the preset range.

Figure 15:
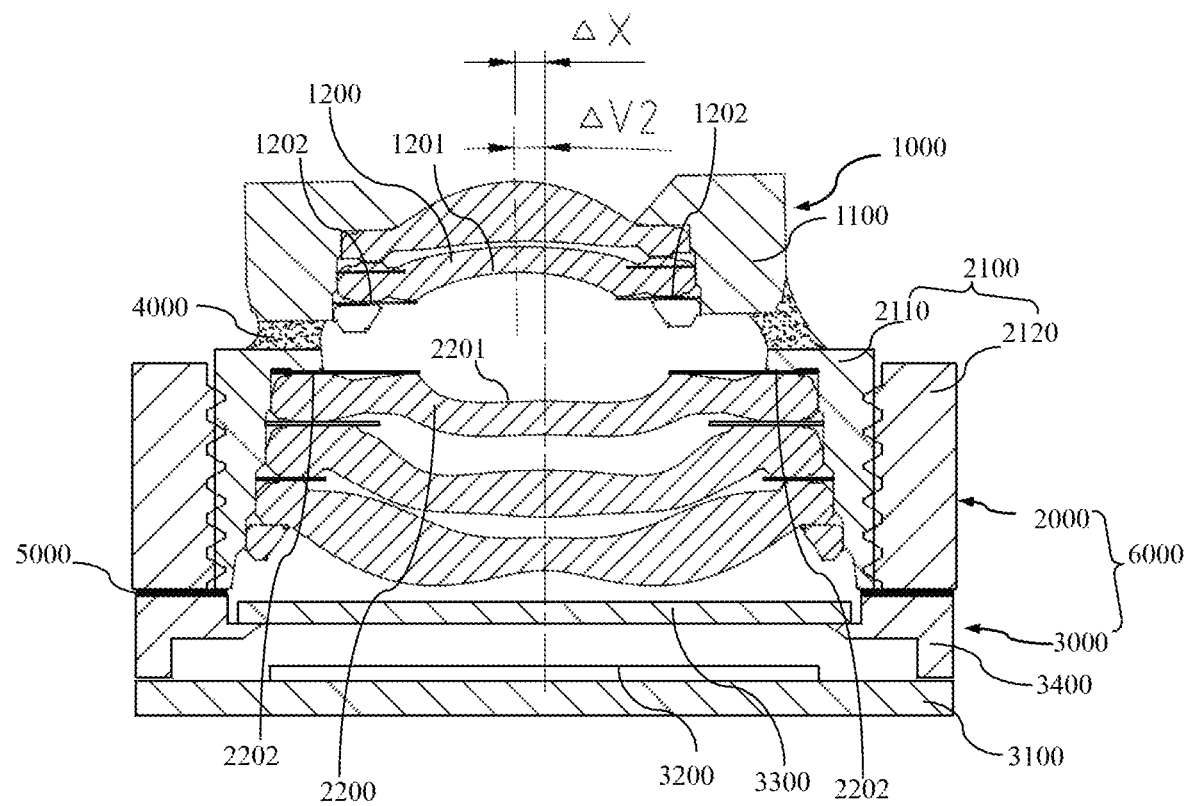
FIG. 15 illustrates a camera module according to an embodiment of the present invention.

According to an embodiment of the present invention, a camera module obtained by the above-mentioned method for assembling a camera module is further provided. FIG. 15 illustrates the camera module in this embodiment. Referring to FIG. 15, the camera module includes a first sub-lens assembly 1000 and a second sub-assembly 6000. The first sub-lens assembly 1000 includes a first lens barrel 1100 and at least one first lens 1200. The second sub-assembly 6000 includes a second sub-lens assembly 2000 and a photosensitive assembly 3000 fixed together. The second sub-lens assembly 2000 includes a second lens barrel 2100 and at least one second lens 2200. The photosensitive assembly 3000 includes a photosensitive element 3300.

The first sub-lens assembly 1000 is arranged on an optical axis of the second sub-lens assembly 2000 to form an optical system capable of imaging and including the at least one first lens 1200 and the at least one second lens 2200.

The first sub-lens assembly 1000 and the second sub-lens assembly 2000 are fixed together by a connecting medium 4000. The connecting medium 4000 is adapted to cause a central axis of the first sub-lens assembly 1000 to have an angle of inclination of smaller than 0.5° with respect to a central axis of the second sub-lens assembly 2000. The connecting medium 4000 is further adapted to cause the relative position of the first sub-lens assembly 1000 and the second sub-lens assembly 2000 to remain unchanged. The relative position cause actual measured resolution of imaging of the optical system, obtained by using the photosensitive element 3300, to be increased to a first threshold, and cause an actual measured image plane inclination of imaging of the optical system, obtained by using the photosensitive element 3300, to be decreased to a second threshold.

In an embodiment, the connecting medium may be an adhesive material or a bonding pad (for example, a metal sheet). The second connecting medium may be an adhesive material or a bonding pad (for example, a metal sheet). The connecting medium by which the first sub-lens assembly and the second sub-lens assembly are connected and fixed together is neither part of the first sub-lens assembly, nor part of the second sub-lens assembly.

In an embodiment, the connecting medium is further adapted to cause the central axis of the first sub-lens assembly to be staggered with respect to the central axis of the second sub-lens assembly by 0 to 15 µm.

In an embodiment, the connecting medium is further adapted to cause the first sub-lens assembly and the second sub-lens assembly to have a structural clearance therebetween. The first sub-lens assembly 1000 and the second sub-lens assembly 2000 both have an optical surface and a structural surface. In the lens assembly, the optical surface is a surface, through which effective light passes, on a lens. Other surfaces on the lens than the optical surface are the structural surfaces. Surfaces located on the lens barrel are all structural surfaces. The structural clearance is a clearance between structural surfaces.

Further, in an embodiment, the second sub-lens assembly 2000 and the photosensitive assembly 3000 are assembled together by means of mechanical alignment, to form the second sub-assembly 6000. A clearance 5000 between 10 µm and 50 µm adapted for mechanical alignment exists between the second sub-lens assembly 2000 and the photosensitive assembly 3000.

Figure 16:
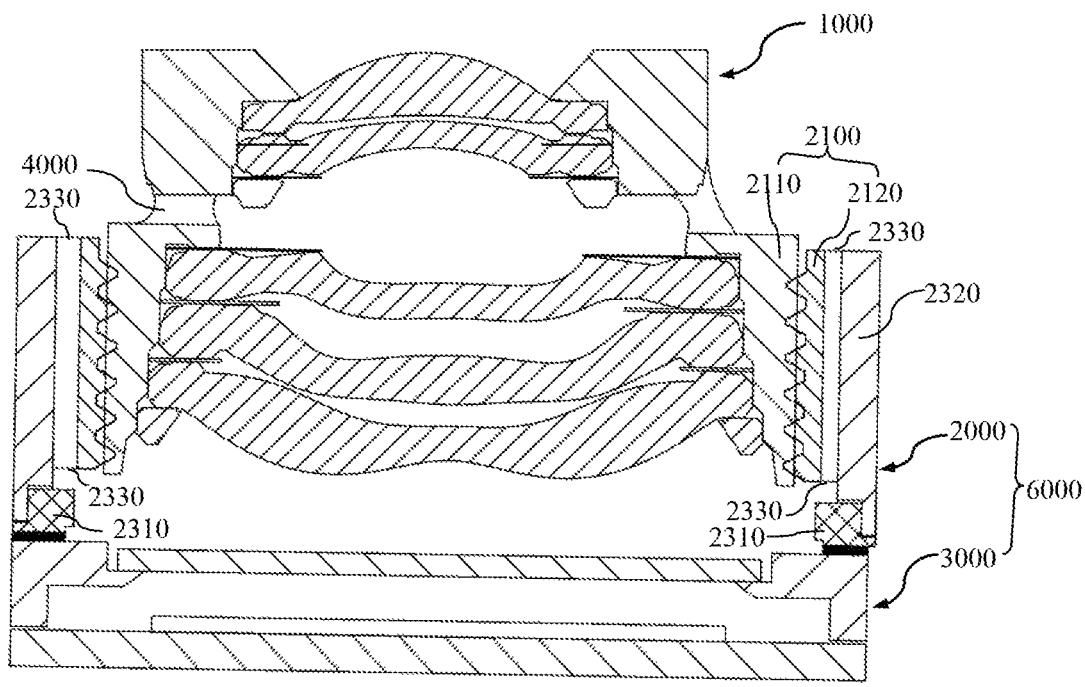
FIG. 16 illustrates an assembled camera module having a motor according to an embodiment of the present invention, where the motor is in off state.

The central axis of the first sub-lens assembly and the central axis of the second sub-lens assembly are mentioned multiple times herein. Referring to FIG. 16, for the convenience of measurement, the central axis of the first sub-lens assembly 1000 may be construed as a central axis of an optical surface 1201, which is closest to the second sub-lens assembly 2000, in the first sub-lens assembly 1000; or may be construed as a central axis defined by a structural surface 1202 of the first lens 1200 that is closest to the second sub-lens assembly 2000. When the first lens 1200 and the first lens barrel 1100 of the first sub-lens assembly 1000 are tightly assembled, the central axis of the first sub-lens assembly 1000 may also be construed as a central axis defined by an inner side surface of the first lens barrel.

Similarly, for the convenience of measurement, the central axis of the second sub-lens assembly 2000 may be construed as a central axis of an optical surface 2201, which is closest to the first sub-lens assembly 1000, in the second sub-lens assembly 2000; or may be construed as a central axis defined by a structural surface 2202 of the second lens 2200 that is closest to the first sub-lens assembly 1000. When the second lens 2200 and the second lens barrel 2100 of the second sub-lens assembly 2000 are tightly assembled, the central axis of the second sub-lens assembly 2000 may also be construed as a central axis defined by an inner side surface of the second lens barrel.

The present invention is particularly suitable for a miniature camera module that is applied to a smart terminal and that includes a lens assembly having a diameter of less than 10 mm. In an embodiment, outer side surfaces of the first sub-lens assembly and the second sub-lens assembly both provide a sufficient contact surface, so that a mechanical arm (or other pick-up apparatus) can pick up (for example, clamp or suck) the first sub-lens assembly and the second sub-lens assembly via the contact surface, thereby implementing the precise adjustment of the relative position of the first sub-lens assembly and the second sub-lens assembly. Such precise adjustment may be adjustment in six degrees of freedom. The adjustment step may reach the micron order or a more precise level.

Figure 17:
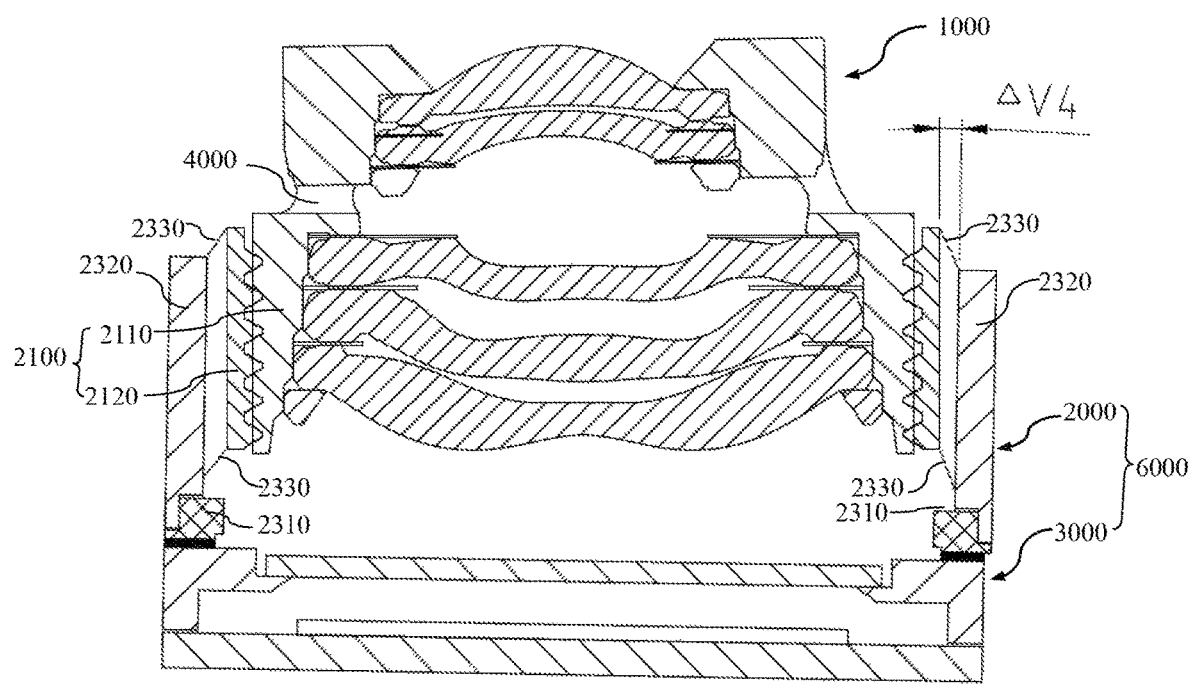
FIG. 17 illustrates an assembled camera module having a motor according to an embodiment of the present invention, where the motor is in on state.
Figure 18:
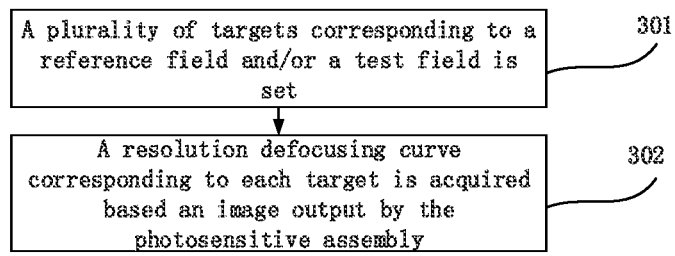
FIG. 18 is a flow chart of a method for obtaining an actual measured resolution of imaging of an optical system according to an embodiment of the present invention.
Figure 19:
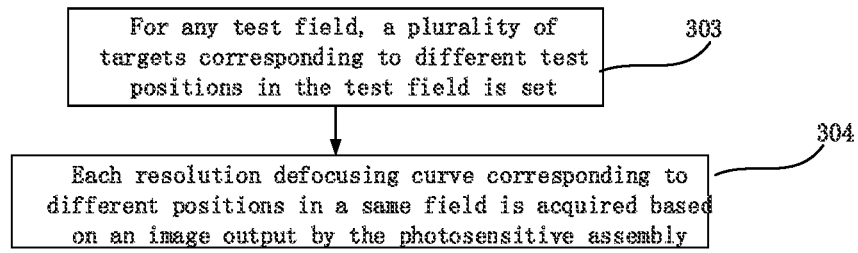
FIG. 19 is a flow chart of a method for acquiring an actual measured image plane inclination according to an embodiment of the present invention.
Figure 20:
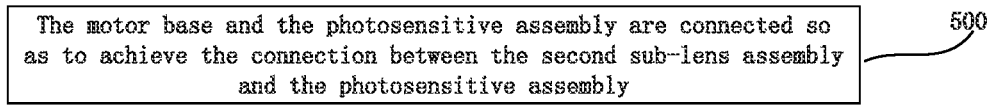
FIG. 20 is a flow chart of a method for achieving a connection between a second sub-lens assembly and a photosensitive assembly according to an embodiment of the present invention.
Figure 21:
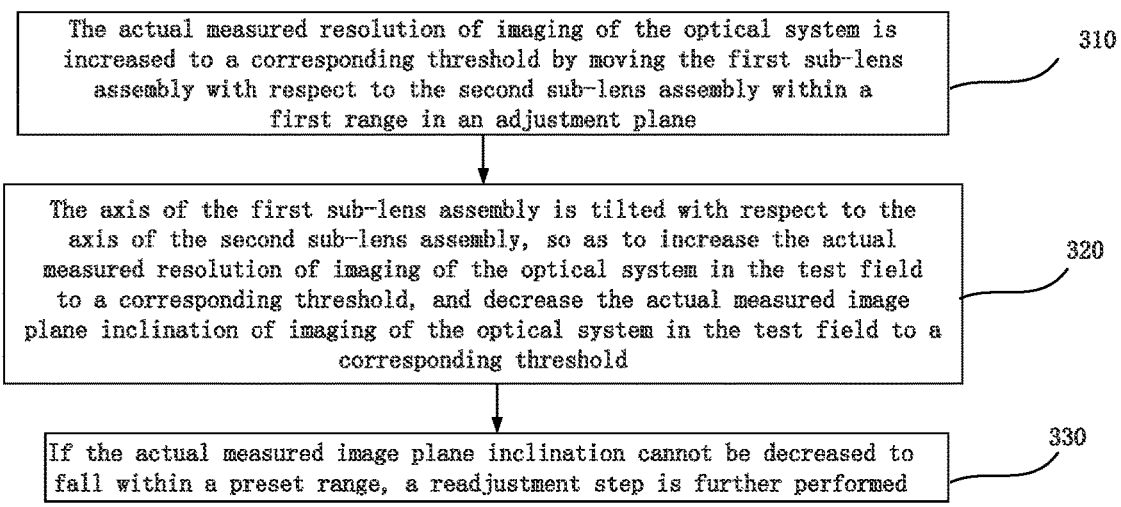
FIG. 21 is a flow chart of sub-steps of step 300 according to an embodiment of the present invention.
Figure 22:
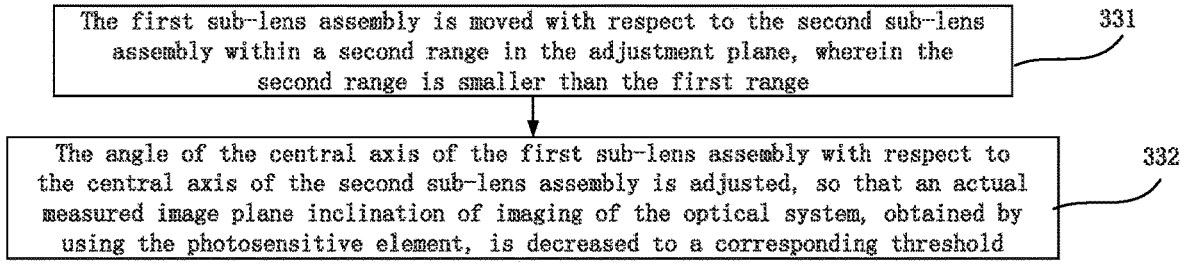
FIG. 22 is a flow chart of sub-steps of step 330 according to an embodiment of the present invention.

Further, in an embodiment, the second sub-lens assembly 2000 may further include a motor, so as to achieve autofocusing of a camera module of a mobile phone. FIG. 16 illustrates an assembled camera module having a motor according to an embodiment of the present invention, where the motor is in off state. FIG. 17 illustrates an assembled camera module having a motor according to an embodiment of the present invention, where the motor is in on state. In this embodiment, the motor includes a motor base 2310 and a motor support 2320 mounted on the motor base 2310. The motor support 2320 surrounds the second lens barrel 2100, and a driving structure (not shown) of the motor is mounted on the motor support 2320. The motor support 2320 is connected to the second lens barrel 2100 by a reed 2330. When the driving structure is electrified, the second lens barrel moves along the optical axis, and the reed 2330 deforms (as shown in FIG. 17). In step 310 and step 320, the motor, the second lens barrel 2100, and the second lens 2200 mounted in the second lens barrel 2100 are moved and adjusted as the whole second sub-lens assembly 2000. In step 500, the motor base 2310 and the photosensitive assembly 3000 are connected so as to achieve the connection between the second sub-lens assembly 2000 and the photosensitive assembly 3000. Further, in step 310, when the relative position of the first sub-lens assembly and the second sub-lens assembly are adjusted, the motor is maintained in on state (for example, the motor being electrified may be considered to indicate that the motor is started). In this way, the actual measured resolution acquired is actual measured resolution obtained when the motor is in on state. In step 320, when the angle of inclination of the photosensitive assembly with respect to the central axis of the second sub-lens assembly is adjusted, the motor is also maintained in on state. In this way, the actual measured image plane inclination acquired is an actual measured image plane inclination obtained when the motor is in on state. After the motor is started, the reed deforms correspondingly. However, compared with the case where the motor is in off state, the deformation of the reed due to starting of the motor may lead to an additional inclination of the central axis of the second lens barrel with respect to the central axis of the first sub-lens assembly (referring to the angle of inclination $\Delta v4$ in FIG. 17). In the solution of this embodiment, the additional inclination of the second lens barrel caused by starting of the motor can be compensated for during the adjustment in step 310 and step 320, thereby further improving the imaging quality of the autofocus camera module.

The foregoing is only a description of the preferred implementations of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for assembling a camera module, the method comprising:

preparing a first sub-lens assembly and a second sub-assembly, wherein the first sub-lens assembly comprises a first lens barrel and at least one first lens, the second sub-assembly comprises a second sub-lens assembly and a photosensitive assembly fixed together, the second sub-lens assembly comprises a second lens barrel and at least one second lens, and the photosensitive assembly comprises a photosensitive element;

arranging the first sub-lens assembly on an optical axis of the second sub-lens assembly to form an optical system capable of imaging and comprising the at least one first lens and the at least one second lens;

adjusting a relative position of the first sub-lens assembly with respect to the second sub-lens assembly, so as to increase an actual measured resolution of imaging of the optical system, obtained by using the photosensitive element, to a first threshold, and decrease an actual measured image plane inclination obtained by using the photosensitive element to a second threshold; and connecting the first sub-lens assembly and the second sub-lens assembly, so that the relative position of the first sub-lens assembly and the second sub-lens assembly remain unchanged;

wherein a step of adjusting the relative position of the first sub-lens assembly with respect to the second sub-lens assembly further comprises:

moving the first sub-lens assembly with respect to the second sub-lens assembly in a direction z, so that an actual measured image plane of imaging of the optical system, obtained by using the photosensitive element, matches a target surface, wherein the direction z is a direction along the optical axis.

2. The method for assembling a camera module according to claim 1, wherein in the step of adjusting the relative position of the first sub-lens assembly with respect to the second sub-lens assembly, the adjusting the relative position comprises:

increasing the actual measured resolution of imaging of the optical system by moving the first sub-lens assembly with respect to the second sub-lens assembly in an adjustment plane.

3. The method for assembling a camera module according to claim 2, wherein in the step of adjusting the relative position of the first sub-lens assembly with respect to the second sub-lens assembly, the movement in the adjustment plane comprises translation and/or rotation in the adjustment plane.

4. The method for assembling a camera module according to claim 1, wherein in the step of adjusting the relative position of the first sub-lens assembly with respect to the second sub-lens assembly, the adjusting the relative position comprises: adjusting an angle of an axis of the first sub-lens assembly with respect to an axis of the second sub-lens assembly.

5. The method for assembling a camera module according to claim 1, wherein the step of adjusting the relative position of the first sub-lens assembly with respect to the second sub-lens assembly comprises the following sub-steps:

moving the first sub-lens assembly with respect to the second sub-lens assembly in an adjustment plane, so as to increase actual measured resolution of imaging of the optical system in a reference field, obtained by using the photosensitive element, to a corresponding threshold; and adjusting an angle of an axis of the first sub-lens assembly with respect to an axis of the second sub-lens assembly, so as to increase actual measured resolution of imaging of the optical system in a test field, obtained by using the photosensitive element, to a corresponding threshold, and decrease an actual measured image plane inclination in the test field, obtained by using the photosensitive element, to the second threshold.

6. The method for assembling a camera module according to claim 5, wherein obtaining the actual measured image plane inclination comprises:

For the test field, setting a plurality of targets corresponding to different test positions in the test field; and acquiring a resolution defocusing curve corresponding to each test position based on an image output by the photosensitive assembly.

7. The method for assembling a camera module according to claim 6, wherein the decreasing the actual measured image plane inclination to the second threshold is: making a position offset of the peak values of the resolution defocusing curves corresponding to different test positions in the test field along the optical axis direction reduce to the second threshold.

8. The method for assembling a camera module according to claim 7, wherein the decreasing the actual measured image plane inclination to the second threshold is:

making a position offset of the peak values of the resolution defocusing curves corresponding to different test positions in the test field along the optical axis direction reduce to a range of +/−5 μm.

9. The method for assembling a camera module according to claim 5, wherein obtaining the actual measured resolution of imaging of the optical system comprises:

setting a plurality of targets corresponding to different test positions in the reference field and the test field; and acquiring a resolution defocusing curve corresponding to each test position based on an image output by the photosensitive assembly.

10. The method for assembling a camera module according to claim 9, wherein in the sub-step of moving the first sub-lens assembly with respect to the second sub-lens assembly in an adjustment plane, the increasing the actual measured image plane inclination to a corresponding threshold is: increasing peaks of resolution defocusing curves corresponding to different test positions in the reference field to a corresponding threshold.

11. The method for assembling a camera module according to claim 9, wherein in the sub-step of adjusting an angle of an axis of the first sub-lens assembly with respect to an axis of the second sub-lens assembly, the increasing the actual measured resolution to a corresponding threshold comprises: increasing a smallest one of peaks of a plurality of resolution defocusing curves corresponding to different test positions in the test field to a corresponding threshold.

12. The method for assembling a camera module according to claim 1, wherein the step of adjusting the relative position of the first sub-lens assembly with respect to the second sub-lens assembly comprises the following sub-steps:

moving the first sub-lens assembly with respect to the second sub-lens assembly within a first range in the adjustment plane, so as to increase actual measured resolution of imaging of the optical system in a reference field, obtained by using the photosensitive element, to a corresponding threshold; and then adjusting an angle of an axis of the first sub-lens assembly with respect to an axis of the second sub-lens assembly, so as to increase actual measured resolution of imaging of the optical system in a test field, obtained by using the photosensitive element, to a corresponding threshold, and decrease an actual measured image plane inclination in the test field obtained by using the photosensitive element; and if the actual measured image plane inclination cannot reach the second threshold, further performing a readjustment step until the actual measured image plane inclination is decreased to the second threshold, wherein the readjustment step comprises:

moving the first sub-lens assembly with respect to the second sub-lens assembly within a second range in the adjustment plane, wherein the second range is smaller than the first range; and adjusting an angle of a central axis of the first sub-lens assembly with respect to a central axis of the second sub-lens assembly, so as to decrease the actual measured image plane inclination of imaging of the optical system obtained by using the photosensitive element.

13. A camera module, comprising:

a first sub-lens assembly, comprising a first lens barrel and at least one first lens; and a second sub-assembly, comprising a second sub-lens assembly and a photosensitive assembly fixed together, wherein the second sub-lens assembly comprises a second lens barrel and at least one second lens, and the photosensitive assembly comprises a photosensitive element, wherein the first sub-lens assembly is arranged on an optical axis of the second sub-lens assembly to form an optical system capable of imaging and comprising the at least one first lens and the at least one second lens; and the first sub-lens assembly and the second sub-lens assembly are fixed together by a connecting medium, and the connecting medium is adapted to cause a central axis of the first sub-lens assembly to have an angle of inclination with respect to an axis of the second sub-lens assembly;

wherein the connecting medium is further adapted to cause a relative position of the first sub-lens assembly and the second sub-lens assembly to remain unchanged, and the relative position cause actual measured resolution of imaging of the optical system, obtained by using the photosensitive element, to be increased to a first threshold, and cause an actual measured image plane inclination of imaging of the optical system, obtained by using the photosensitive element, to be decreased to a second threshold.

14. The camera module according to claim 13, wherein the connecting medium is further adapted to cause the central axis of the first sub-lens assembly to be staggered with respect to the central axis of the second sub-lens assembly.

15. The camera module according to claim 13, wherein the connecting medium is further adapted to cause the first sub-lens assembly and the second sub-lens assembly to have a structural clearance therebetween.

16. The camera module according to claim 13, wherein the central axis of the first sub-lens assembly has an angle of inclination of smaller than 0.5° with respect to the central axis of the second sub-lens assembly.

17. The camera module according to claim 13, wherein the second sub-lens assembly further comprises a motor, the actual measured resolution is obtained when the motor is in on state, and the actual measured image plane inclination is obtained when the motor is in on state.

18. The camera module according to claim 13, wherein a clearance between 10 μm and 50 μm exists between the second sub-lens assembly and the photosensitive assembly.

* * * * *